United States Patent [19]

Krieter

[11] Patent Number: 5,526,411
[45] Date of Patent: Jun. 11, 1996

[54] INTEGRATED HAND-HELD PORTABLE TELEPHONE AND PERSONAL COMPUTING DEVICE

[75] Inventor: Marcus A. Krieter, Irvine, Calif.

[73] Assignee: Radio, Computer & Telephone Corporation, Minnetonka, Minn.

[21] Appl. No.: 207,789

[22] Filed: Mar. 8, 1994

Related U.S. Application Data

[63] Continuation-in-part of Ser. No. 929,686, Aug. 13, 1992, abandoned.

[51] Int. Cl.$^6$ .......................... H04M 1/00; H04M 1100
[52] U.S. Cl. .......................... 379/110; 379/58; 379/433; 379/434
[58] Field of Search .................. 379/110, 93, 96, 379/58, 59, 433, 434, 441, 442, 447, 450; 364/705.05; D14/100, 101, 137, 138, 140, 147, 151, 144, 248–254, 217, 221, 225, 240, 249; 455/89, 90, 350; 381/188, 160, 205, 156; 345/1, 4, 87

[56] References Cited

U.S. PATENT DOCUMENTS

| D. 332,604 | 1/1993 | Miyake et al. | D14/100 |
|---|---|---|---|
| 4,481,382 | 11/1984 | Villa-Real | 379/110 |
| 4,675,903 | 6/1987 | Gulezian et al. | 379/433 |
| 4,725,694 | 2/1988 | Auer et al. | 379/96 |
| 5,189,632 | 2/1993 | Paajanen et al. | 379/59 |

FOREIGN PATENT DOCUMENTS

| 2248747 | 4/1992 | United Kingdom | 379/433 |
|---|---|---|---|

*Primary Examiner*—Jason Chan
*Attorney, Agent, or Firm*—Patterson & Keough

[57] ABSTRACT

An integrated portable phone and personal computing device has a hand-held body structure that allows the device to be comfortably held as a telephone receiver, yet is configured in such a way as not to decrease the computing capabilities of the device. The body structure provides for a display screen and input unit on a front surface of the device with a speaker and a microphone located on a side surface of the device. The arrangement for the body structure increases the useable surface area for both the display screen and input unit by providing for a combined display screen and input unit on the front surface. An activation key on the side of the unit inhibits data entry on the input unit when the device is being held as a telephone receiver without the need for a cover over the input unit. The arrangement for the body structure also decreases the overall width of the device by providing for structure that expands the width of a portion of the side surface around the speaker to a width that is larger and more comfortable as an ear piece for a telephone receiver.

9 Claims, 3 Drawing Sheets

INTEGRATED HAND-HELD PORTABLE TELEPHONE AND PERSONAL COMPUTING DEVICE

RELATED APPLICATION

The present invention is a continuation-in-part of an application previously filed with the United States Patent and Trademark Office on Aug. 13, 1992, Ser. No. 07/929,686, entitled "INTEGRATED PORTABLE PHONE AND PERSONAL COMPUTING DEVICE", now abandoned which is assigned to the assignee of the present invention and the disclosure of which is hereby incorporated by reference in this application.

BACKGROUND

1. Field of the Invention

The present invention relates generally to the combination of a phone and a personal computer in a single portable device. More particularly, the present invention relates to an integrated portable telephone and personal computing device having a hand-held housing that has an improved user interface to both the telephone and computer functions of the device.

2. Background of the Invention

Various attempts have been made in the past to combine both telephone and personal computer functions in a single portable device.

One of the earliest of these devices is shown in German Patent DT 2727-335, issued Dec. 21, 1978 for a mobile telephone transceiver having an alphanumeric keypad with a one-line display and a speaker and microphone incorporated on the front face of the handset. Other examples of handset-type devices which utilize a keypad and/or display screen for the personal computer portion of the device that is arranged on the same face or surface as the speaker and microphone for the telephone portion of the handset include U.S. Pat. Nos. 4,481,382 and 5,140,138. In U.S. Pat. Nos. 5,123,064, Des. 295,411 and Des. 332,604, the telephone speaker and microphone are arranged on a front surface of the handset, while the keypad and display screen are arranged on the opposite or back surface of the handset. In U.S. Pat. No. 4,850,009, the keypad and display screen for the computer are on the same surface as the microphone and speaker for the telephone portion of the handset, but a handle has been added to the back surface of the handset in order to allow the handset to be held more conveniently. The problem with most handset-type devices has been that the relatively small size of the handset effectively limits the capability of the computer portion of the device.

In order to increase the capabilities of the computer portion of the device and provide the user with a more standard computer interface, a conventional laptop or portable computer has been provided with an attached handset or an integrated speaker and microphone. Examples of these type of laptop-type combination telephone and computer devices are shown in U.S. Pat. Nos. Des. 284,193, 314,752, 323,156 and 324,036. None of these devices, however, are truly hand-held portable devices due to the relatively large size of the laptop computer portion of the device.

In an effort to decrease the overall size of the combination computer and telephone without decreasing the capabilities of the computer portion of the device, several devices have utilized a folding-type arrangement for the housing of the device as shown, for example, in U.S. Pat. No. 5,189,632. In this patent, a portable computer telephone device has a keypad and display on a front surface of the device and a speaker and microphone on one side of the device. The front surface of the device includes a cover that is pivotally mounted such that only a portion of the keypad, such as the numeric dialing pad, and a portion of the display screen are exposed when the cover is closed. This allows for a larger effective keypad and display screen, while still enabling the device to be hand-held. Other examples of hand-held, folding-type combination telephone and computer devices are shown in U.S. Pat. Nos. 4,661,659, Des. 304,930 and Des. 315,347. The problem with these folding-type of devices is that the folding operation can interfere with the convenient use of the device. While the cover portion allows the device to be hand-held without inadvertently entering data on the keypad, when use of the keypad is desired the user must open the cover in order to access the keypad. In addition, the overall width of the device is increased by the cover portion making the device less comfortable to hold for long periods of time.

Although the combination of both telephone and personal computer functions in a hand-held device is very desirable, it has been difficult to provide an easy and convenient interface to the screen and keypad functions of the computer portion of the device that does not inherently decrease the computing capabilities of the device, while still maintaining a handset that is small enough to be hand-held and is comfortable enough as a telephone receiver to carry on extended telephone conversations. Consequently, it would be desirable to provide an integrated portable phone and personal computing device having a hand-held housing that has an improved user interface to both the telephone and computer functions of the device.

SUMMARY OF THE INVENTION

The present invention is an integrated portable phone and personal computing device having a hand-held body structure that allows the device to be comfortably held as a telephone receiver, yet is configured in such a way as not to decrease the computing capabilities of the device. The body structure provides for a display screen and input unit on a front surface of the device with a speaker and a microphone located on a side surface of the device. The arrangement for the body structure increases the useable surface area for both the display screen and input unit by providing for a combined display screen and input unit on the front surface. An activation key on the side of the unit inhibits data entry on the input unit when the device is being held as a telephone receiver without the need for a cover over the input unit. The arrangement for the body structure also decreases the overall width of the device by providing for structure that expands the width of a portion of the side surface around the speaker to a width that is larger and more comfortable as an ear piece for a telephone receiver.

In accordance with a first aspect of the present invention, an integrated portable telephone and personal computing device comprises a personal computer unit and a telephone unit housed within a hand-held body structure. The body structure includes a front surface on which there is a combined display screen and an input unit, a first side surface on which there is a microphone and a speaker, and a second side surface on which there is at least one activation key. The activation key on the second side surface activates the input unit on the front surface such that the input unit is not active unless the activation key is engaged, thereby allowing the device to be hand-held without the need for a cover over the input unit.

In accordance with a second aspect of the present invention, an integrated portable telephone and personal computing device comprises a personal computer unit and a telephone unit housed within a hand-held body structure. The body structure includes a front surface on which there is a display screen and an input unit and a side surface on which there is a microphone and a speaker. The side surface presents a first width and includes structure for expanding the width of a portion of the side surface proximate the speaker to a second width that is larger than the first width.

DETAILED DESCRIPTION OF THE PREFERRED EMBODIMENT

Figure 1:
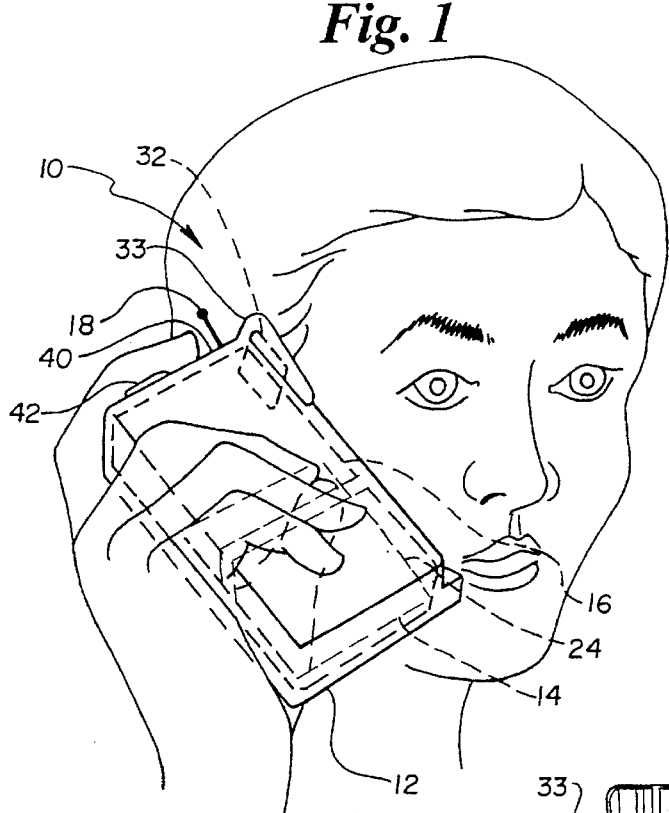
FIG. 1 is a perspective view of a preferred embodiment of the present invention showing the device in use as a telephone receiver.
Figure 3:
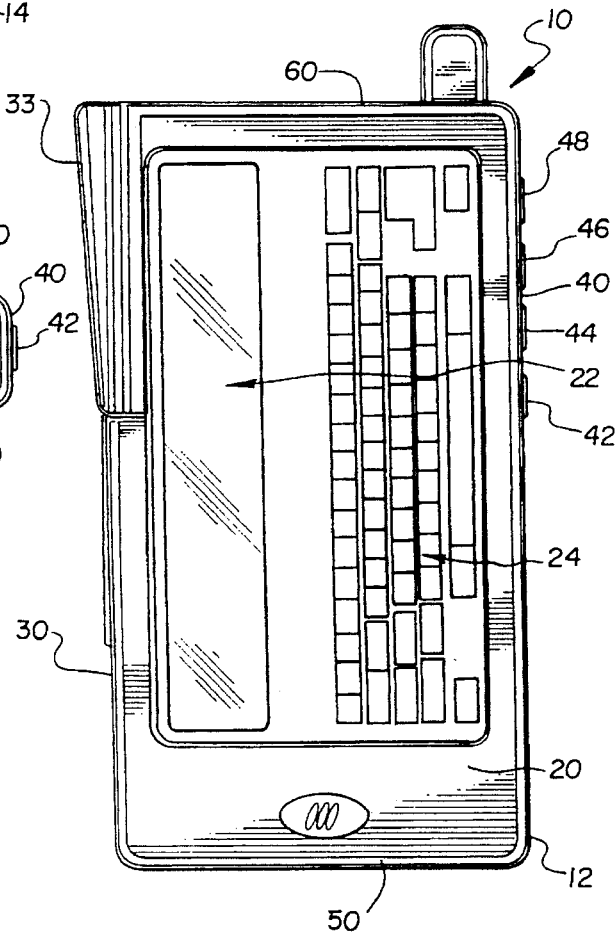
FIG. 3 is a top view showing the front of the embodiment shown in FIG. 1.
Figure 4:
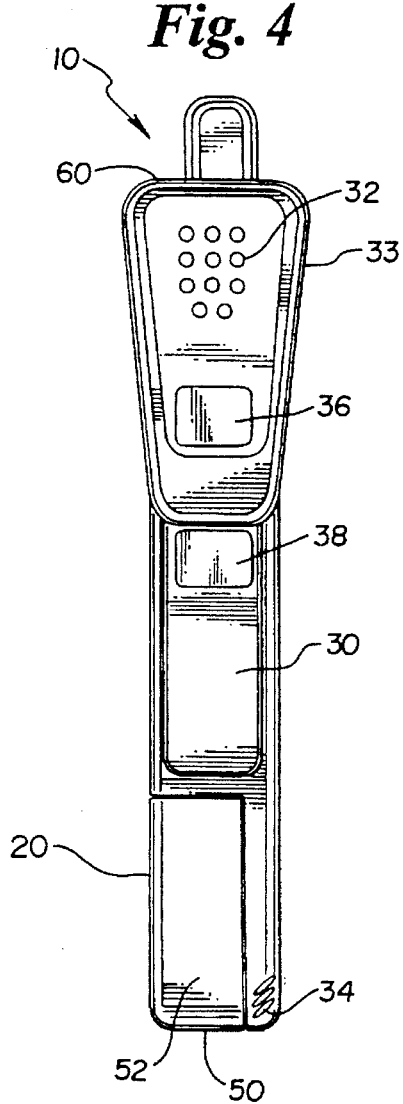
FIG. 4 is a side view showing a first side of the embodiment shown in FIG. 1.
Figure 5:
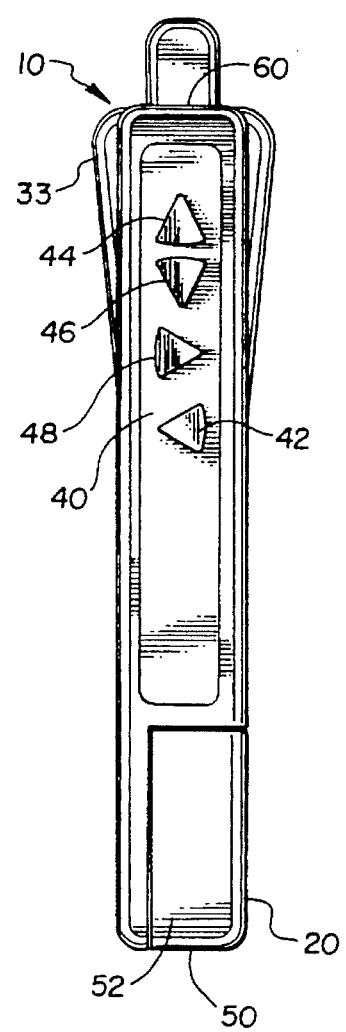
FIG. 5 is a side view showing a second side of the embodiment shown in FIG. 1.

Referring to FIG. 1, a preferred embodiment of an integrated portable telephone and personal computer device 10 is shown in a hand-held position with device 10 being used as a telephone transceiver. Device 10 includes a body structure 12 for housing a telephone unit 14 and a personal computer unit 16 (shown in phantom lines). An antenna 18 is connected to telephone unit 14 to allow telephone unit 14 to send and receive data and voice signals as radio frequency signals. Telephone unit 14 and personal computer unit 16 are each preferably comprised of one or more integrated circuit devices that mounted on a common substrate within body structure 12. As shown best in FIG. 3, on a front side 20 are located a combination display screen 22 and input keypad 24. The front surface has dimensions which are less than 10 cm by 17 cm. On a first side 30 facing the user when device 10 is used as a telephone transceiver are located a telephone speaker 32 and a telephone microphone 34, as shown best in FIG. 4. On a second side 40 away from the user when device 10 is used as a telephone transceiver are located one or more activation keys 42, as shown best in FIG. 5. Device 10 generally presents a first width of body structure 12 as shown in FIG. 3, for example, at 11. Along a portion of first side 30 that is proximate telephone speaker 32, the second width of body structure 12, as shown at 31, is expanded beyond first width 11 by an earpiece structure 33.

It can be seen from FIG. 1 that device 10 is easily held within one hand when in use as a telephone transceiver and that the bottom of the hand is in contact with device 10 on input keypad 24. Without the use of activation keys 42 as provided for by the present invention, this contact with input keypad 24 while holding device 10 would result in inadvertent entries on keypad 24. Unlike the prior art which locates the input unit on the same or directly opposite surface from the speaker and microphone, or which uses some type of cover to protect the keypad from contact while the device is used as a telephone transceiver, the present invention allows contact to be made with input keypad 24 while device 10 is being used as a telephone transceiver. Because activation key 42 has not been engaged, however, this contact does not result in an inadvertent input that would otherwise initiate some type of activity by telephone unit 14 or personal computer unit 16.

It can also be seen from FIG. 1 that when device 10 is used as a telephone transceiver, earpiece structure 33 provides an expanded surface area for placing telephone speaker 32 next to the user's ear. Without earpiece structure 33, first width 11 of device 10 would result in an uncomfortable interface between telephone speaker 32 and the user's ear. Preferably, first width 11 is less than about 3 cm and second width 31 is greater than 3.5 cm. Alternatively, second width 31 should be between 20 to 50 percent greater than first width 11. These dimensions allow for device 10 to be thin enough to be easily hand-held, yet provide sufficient surface area at earpiece 33 to allow for a comfortable interface with the user's ear.

In a preferred embodiment, first side surface 30 also includes a SND key 36 and a RCV key 38 which operate as send and receive inputs in a manner typical of any portable or celluar telephone. Second side surface 40 preferably includes an activation key 42 and three other control keys 44, 46 and 48. By depressing activation key 42, device 10 is placed in a data entry mode such that input keypad 24 is displayed on a touch-sensitive or pen sensitive display screen 22. As shown in FIG. 3, in the data entry mode, only a limited portion of display screen 22 is used for display and the remaining portion is used as input keypad 24. When activation key 42 is depressed again, device 10 exits the data entry mode and returns to one of a number of available display modes. In one of these display modes, referred to as the dialer display and shown, a list of names and telephone numbers are displayed on display screen 22 and a user can scroll through the available entries by using control keys 48 and 46 as up and down arrows. In this embodiment, control key 44 is used as an enter key to select a desired entry. Once selected, touching SND key 36 will call the telephone number stored in a memory within computer unit 16 for the indicated entry.

As the present invention relates primarily to body structure 12 of device 10, the details of telephone unit 14 and personal computer unit 16 will not be described as these parts may be of any one of a number of compatible parts known to a person skilled in the art. In a preferred embodiment, personal computer unit 16 include a 80486-based microcomputer running an operating system program for personal digital assistants (PDAs) known as WinPad™, available from Microsoft Corp, and telephone unit 14 is a standard celluar phone transceiver chip set available from Phillips Corp. Although device 10 preferably has both celluar phone and PC-compatibility functionality, it will be recognized that the functionality of the present invention is not limited to these embodiments. For example, telephone unit 14 may include a standard portable phone local RF transceiver or a pager transceiver, in addition to the standard celluar phone transceiver. This additional functionality may be included within body structure 12, or may be added by circuitry in an expansion slot. Personal computer unit 16 may emulate the functionality of any one of a variety of personal digital assistants (PDAs), and may include handwriting recognition or speech recognition functionality in addition to screen display 22 and input keypad 24. For a more detailed explanation of the operational capabilities of a preferred embodiment of the present invention, reference is made to the previously-identified parent application entitled "INTEGRATED PORTABLE PHONE AND PERSONAL COMPUTING DEVICE"

Figure 2:
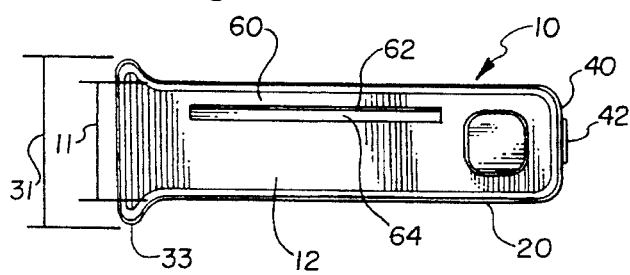
FIG. 2 is an end view showing a top end of the embodiment shown in FIG. 1.
Figure 6:
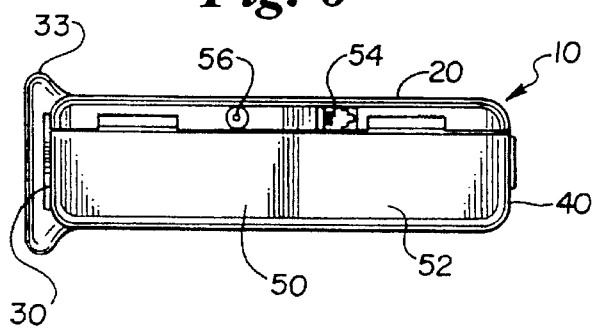
FIG. 6 is an end view showing a bottom end of the embodiment shown in FIG. 1.

In a preferred embodiment as shown in FIGS. 2 and 6, device 10 includes a battery compartment 52 which is accessible from a bottom end 50 of device 10. Device 10 also includes one or more expansion ports 62 in a top end 60. Each expansion port 62 is electrically connected to personal computer unit 16 and is capable of receiving a PCMCIA card or the like so as to expand the functionality of personal computer unit 16. In an alternate embodiment, bottom end 50 may also include an RJ-11 jack 54 for directly connecting telephone unit 14 with a land line telephone line and a DC-power connection 56 for charging and/or powering device 10 through a remote power adapter (not shown). Top end 60 may also be provided with any one of a number of external port connections 64, such as an RS-232 jack, a SCSI small block connector or the like.

Figure 7:
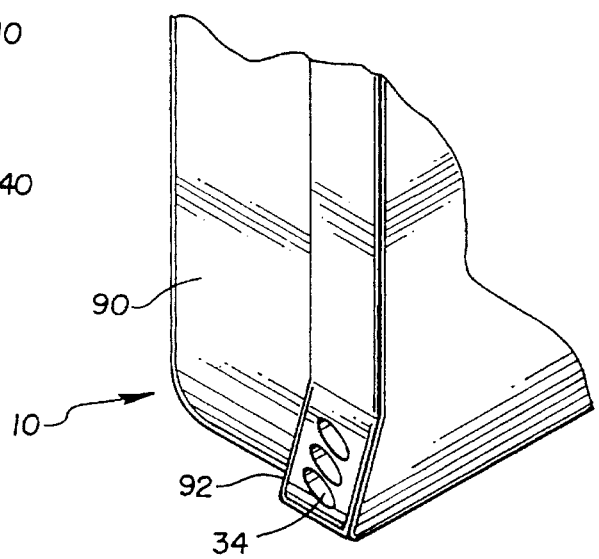
FIG. 7 is a detail view showing an alternate embodiment of the microphone area of the body structure of the present invention.

Referring now to FIG. 7, an alternate embodiment of first side surface 90 is shown. In this embodiment, side surface 90, including telephone microphone 34, is provided with an angled portion 92 at the bottom end of side surface 90 proximate telephone microphone 34. In this way, a more convenient and efficient interface is provided between telephone microphone 34 and the user's mouth when device 10 is used as a telephone transceiver. Although this embodiment is shown as having a single oblique angle between side surface 90 and angled portion 92, it will be recognized that numerous other variations can be made to the contour of side surface 90 to angle or curve the bottom portion closer to the user's mouth when device 10 is held in place as a telephone transceiver. In one embodiment as shown in FIG. 1, a second angled portion is also made near the top of side surface 90 to bring telephone speaker 32 closer to the user's ear. It will be understood that a natural hand hold is created between the two angled portions in this embodiment, making device 10 even easier to hold.

Figure 8:
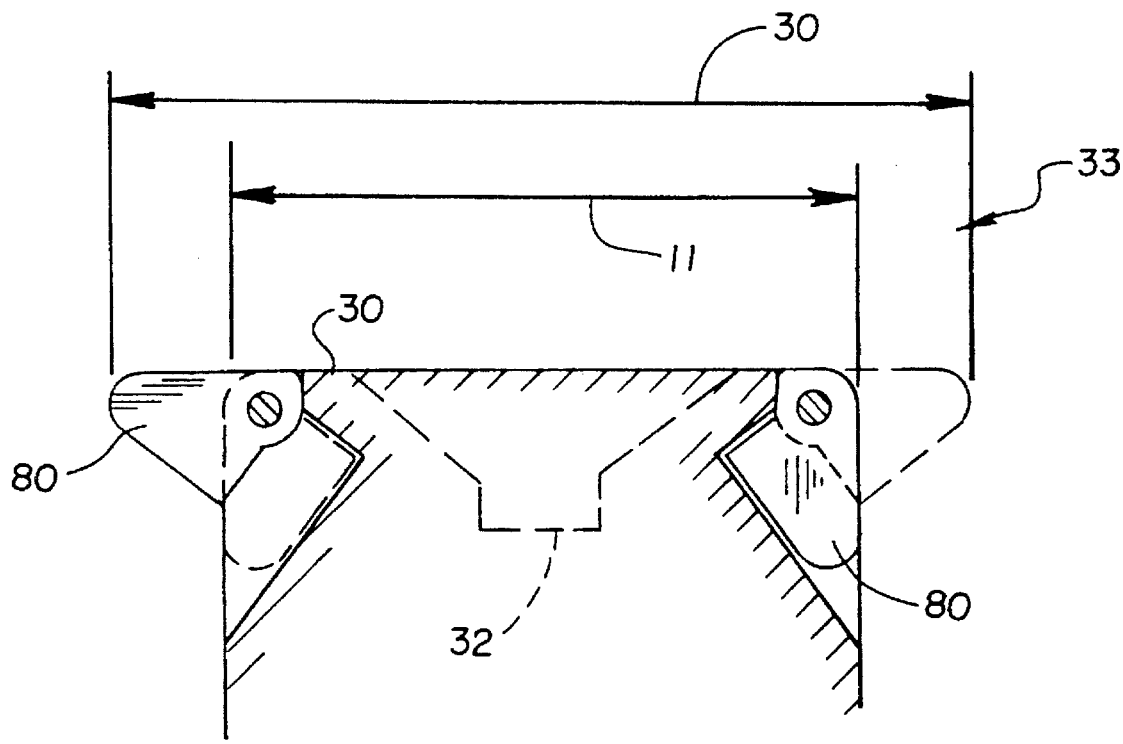
FIG. 8 is a detail view showing an alternate embodiment of the speaker area of the body structure of the present invention.

Referring now to FIG. 8, an alternate embodiment of earpiece structure 33 is shown. In this embodiment, earpiece structure 33 comprises a pair of opposed spring-mounted members 70, each of which has a flap member 72 that extend from a respective edge of first side 30 when in an expanded position to present second width 31. Members 70 and flap members 72 are compressed by the user to the respective edge of side 30 when in a retracted position and held in place by latches 74. In one version of this embodiment, a switch 76 is included such that at least one member 70 will, for example, break an electrical connection of switch 76 when in the extended position and will make an electrical connection of switch 76 when in the retracted position. Switch 76 can thus replace both SND key 36 and RCV key 38 to allow a user to send or answer a telephone call merely by squeezing members 70 together to release them to their extended position. The telephone call can be terminated by again squeezing members 70 together to relatch members 70 in their retracted position.

Figure 9:
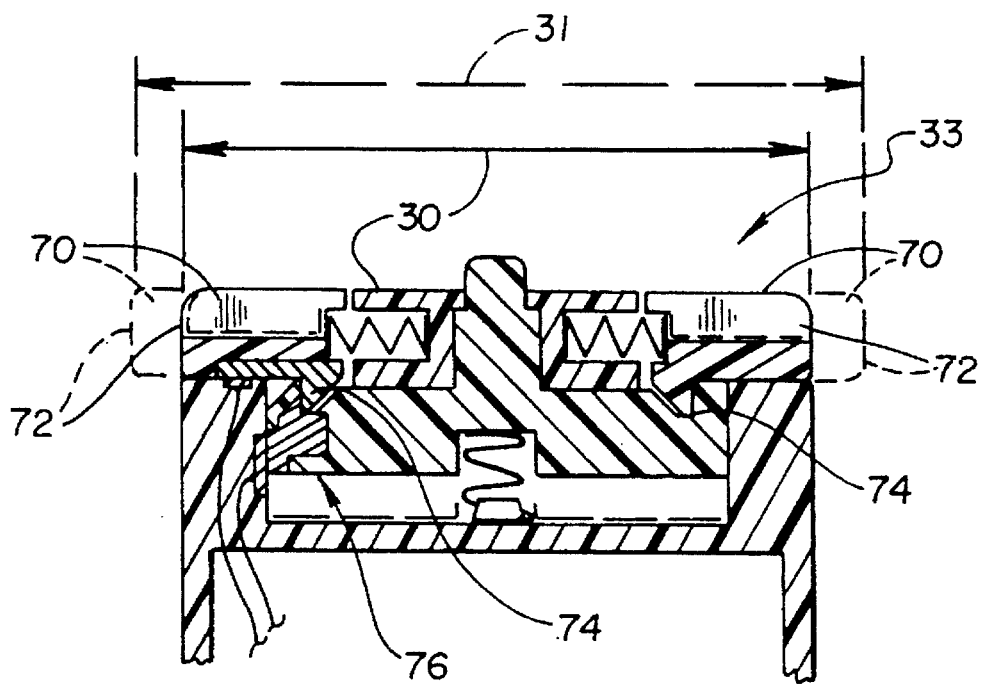
FIG. 9 is a detail view showing an alternate embodiment of the speaker area of the body structure of the present invention.

Another alternate embodiment to earpiece structure 33 is shown in FIG. 9. In this embodiment, one or more ear members 80 are pivotally mounted to first side 30 proximate telephone speaker 32. To open ear members 80, the user simply flips ear members 80 from a closed position presenting first width 11 to an open position present second width 31. One advantage of both of the embodiments shown in FIGS. 8 and 9 is that device 10 present a flat front surface 20 when members 70 or 80 are in their retracted position. In the embodiment shown in FIG. 3, front surface 20 is somewhat tilted by earpiece structure 33. It will be apparent that a similar extension to earpiece structure 33 can be added at the bottom end of first side 30 so that front surface present a uniformly tilted surface to the user when used as a personal computer.

I claim:

1. An integrated portable telephone and personal computing device comprising:

a personal computer unit;

a telephone unit; and a hand-held body structure housing both the personal computer unit and the telephone unit, the body structure including:
   a front surface having a display screen and an input unit disposed on the front surface; and
   a side surface having a microphone and a speaker disposed on the side surface and presenting a first width, the side surface including means for selectively expanding the width of at least a portion of the side surface proximate the speaker from a retracted position to an expanded position having a second width that is larger than the first width.

2. The device as claimed in claim 1 wherein the front surface has dimensions which are less than 10 cm by 17 cm and the side surface has a width less than 3 cm.

3. The device as claimed in claim 1 wherein the body structure further comprises:

a second side surface having at least one activation key means disposed on the second side surface for activating the input unit on the front surface.

4. The device as claimed in claim 1 wherein the first width is less than 3 cm and the second width is greater than 3.5 cm.

5. The device as claimed in claim 1 wherein the second width is between 20 to 50 percent greater than the first width.

6. The device as claimed in claim 1 wherein the expanding means comprises a pair of opposed spring-mounted members each of which extend from a respective edge of the side surface when in the expanded position to present the second width along the side surface and compress to the respective edge when in the retracted position.

7. The device as claimed in claim 1 wherein the expanding means comprises at least one member pivotally mounted on the side surface which extends beyond an edge of the side surface when in the expanded position to present the second width along the side surface and overlaps at least a portion of the side surface when in the retracted position.

8. The device as claimed in claim 1 wherein the display screen and input unit are integrated together as a pressure sensitive display panel.

9. The device as claimed in claim 1 wherein the side surface is obliquely angled.

* * * * *